United States Patent [19]

Otsuka

[11] Patent Number: 4,795,167
[45] Date of Patent: Jan. 3, 1989

[54] MECHANICAL SEAL

[75] Inventor: Junji Otsuka, Sakaso, Japan

[73] Assignee: Eagle Industry Co., Ltd., Tokyo, Japan

[21] Appl. No.: 93,841

[22] Filed: Sep. 4, 1987

[30] Foreign Application Priority Data

Jun. 26, 1987 [JP] Japan .............................. 62-97313[U]

[51] Int. Cl.⁴ ........................ F16J 15/34; F16J 15/54
[52] U.S. Cl. ........................................ 277/25; 277/68; 277/92; 277/133; 415/111
[58] Field of Search ........................ 277/24, 25, 67, 68, 277/133, 92; 415/111, 170 A, 170 B, 168, 169 R, 169 A

[56] References Cited

U.S. PATENT DOCUMENTS

| | | | |
|---|---|---|---|
| 2,524,124 | 10/1950 | Gyana | 277/67 |
| 2,541,645 | 2/1951 | Fasoti | 277/133 X |
| 3,241,842 | 3/1966 | Schweiger et al. | 277/133 X |
| 3,256,027 | 6/1966 | Chapel | 277/133 X |
| 3,500,959 | 3/1970 | Koch et al. | 277/133 X |
| 3,667,767 | 6/1972 | Bakewell | 277/133 X |
| 4,099,890 | 7/1978 | Murakami et al. | 277/25 X |

FOREIGN PATENT DOCUMENTS 1282719  7/1972  United Kingdom .................. 277/67

Primary Examiner—Allan N. Shoap
Attorney, Agent, or Firm—Jordan and Hamburg

[57] ABSTRACT

A mechanical seal in which fins for causing a positive flow of fluid to be sealed are provided on the outer periphery of a seal cover carrying a seal ring so as not to accumulate a large quantity of slurry contained in the fluid to be sealed in the neighborhood of the seal.

3 Claims, 2 Drawing Sheets

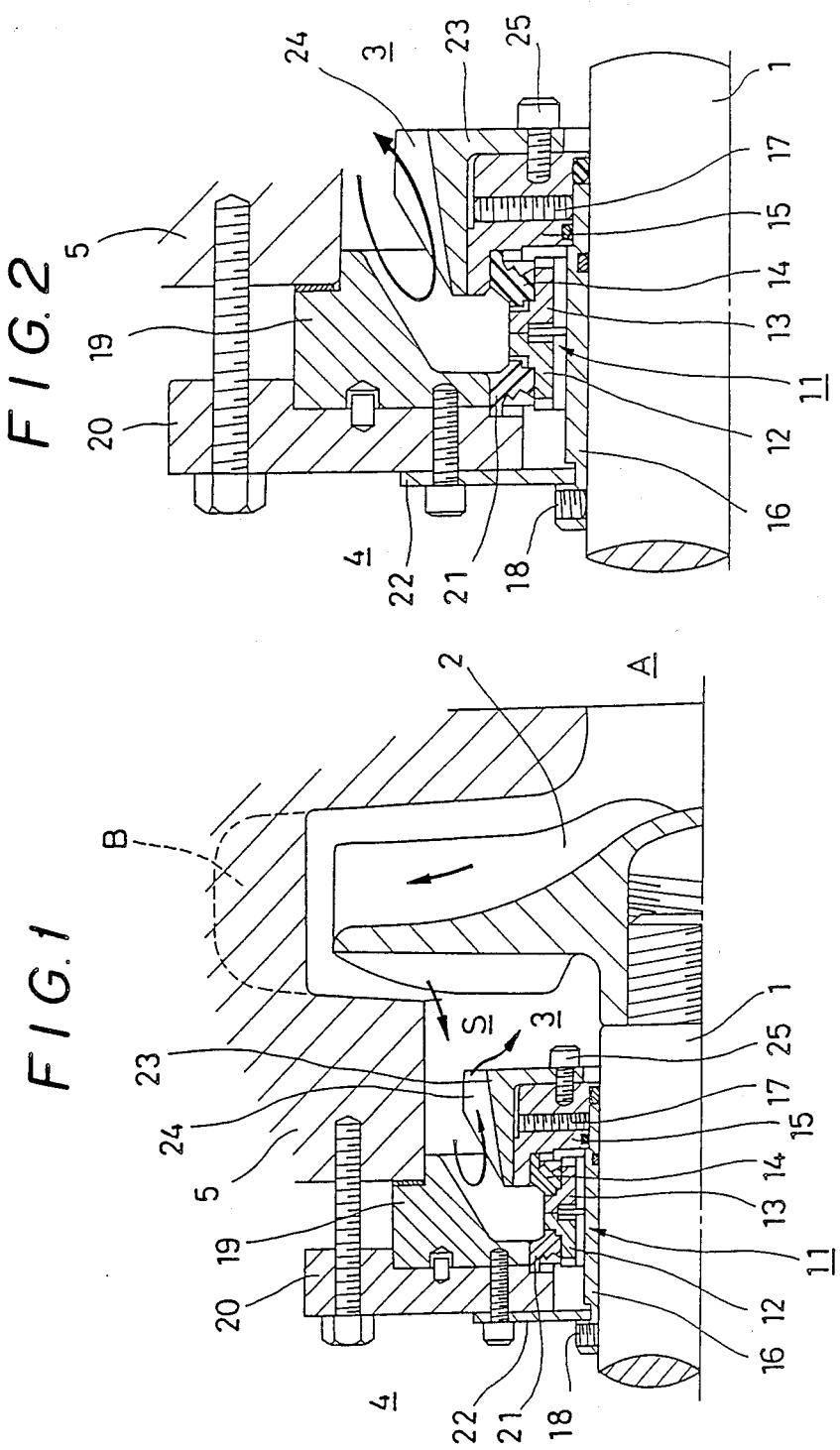

MECHANICAL SEAL

BACKGROUND OF THE INVENTION

The present invention relates to a mechanical seal in connection with a shaft seal, and more specifically to a mechanical seal which is used for a shaft seal portion of a rotating device such as a pump for pumping liquids containing a large quantity of slurries.

One example of the aforesaid pump has been known in which as shown in FIG. 3, an impeller 2 is mounted or the end of a shaft 1 extending from a drive source such as a motor to pump a liquid of slurry containing a large quantity of bauxite or coal powder by rotational operation of the impeller 2. A mechanical seal 11 functioning as a shaft seal device is provided at a boundary between a space 3 on the impeller 2 side and a space 4 on the motor side so as to prevent the slurry liquid from flowing toward the motor side.

A mechanical seal generally designated at 11 has a non-rotational seal ring 12 airtightly carried on the side of a pump housing 5 and a rotational seal ring 13 carried on the shaft 1 side. Both the seal rings 12 and 13 are axially opposed to present slurry liquid S present on the outside diameter of the seal rings 12 and 13 from passing by the opposed rings to the inside diameter.

The seal ring 13 on the rotational side is embraced by a seal cover 15 through a rubber spring 14, the seal cover 15 being fitted in the outer periphery of a sleeve 16 slipped over the shaft 1, and the seal cover 15 and the sleeve 16 are secured to the sleeve 16 or the shaft 1 by means of set screws 17 and 18, respectively. The seal ring 13 on the rotational side is rotated following the shaft 1 together with the sleeve 16, the seal cover 15 and the rubber spring 14.

The seal ring 12 on the non-rotational side is mounted through a rubber spring 21 to flanges 19 and 20 bolted to the pump housing 5. Reference numeral 22 denotes a set plate detachably bolted to the outer end of the flange 20, said set plate having its internal diameter end engaged with a groove of the sleeve 16. In collectively mounting on the pump various members on the stationary side (non-rotational side) composed of the flanges 19, 20, the rubber spring 21 and the seal ring 12 and various members on the rotational side composed of the sleeve 16, the seal cover 15, the rubber spring 14 and the seal ring 13, the aforesaid set plate 22 is used to locate both member groups one another. When the pump is used, the set plate 22 is removed.

In the pump provided with the aforesaid mechanical seal, the slurry liquid pumped by the rotational operation of the impeller 2 is taken from the intake side shown at A and transferred toward discharge side likewise shown at B. As viewed as a general flow passage, the mechanical seal 11 is to be positioned at the dead end portion behind the impeller 2. Accordingly, when part of the slurry liquid flows into the dead end portion as indicated by the arrow in FIG. 3, the slurry contained in the slurry liquid no longer has nowhere to go, and as the result the slurry is accumulated in the neighbourhood of the seal portion of the mechanical seal, resulting in inconveniences in that part of the slurry is forced into the seal portion to cause wear of the important opposed portion of the seal rings 12 and 13 and the like.

To cope with the aforementioned accumulation of slurry, preventive measures in the form of self-flushing have been normally taken. However, in the case where the viscosity of the slurry is high, the flushing hole is sometimes clogged by the slurry. Alternatively, it has been considered to introduce external water into the accumulated portion for flushing. However, in the case where the external water cannot be introduced into the slurry liquid (in the case where they cannot be mixed), the aforesaid method cannot be employed. Accordingly, in these cases, the accumulation of slurry still occurs in the neighbourhood of the seal portion, thus resulting in inconveniences in that the slurry liquid leaks out due to the wear of the seal rings 12 and 13, such that the seal rings 12 and 13 have to be replaced early. It is an object of the present invention to prevent the accumulation of slurry.

SUMMARY OF THE INVENTION

A mechanical seal according to the present invention is characterized in that there is disposed an impeller on the outer periphery of a seal cover which carries a seal ring on the rotational side on one axial end and is rotated by a shaft of a rotational device. The impeller which allows a fluid to be sealed to flow from one axial end toward the other to prevent the slurry contained in the fluid from being accumulated in the neighbourhood of a seal.

More specifically, according to the mechanical seal of the present invention, an impeller is provided on the outer periphery of a seal cover so that rotational operation of the impeller causes a fluid to be sealed to provide a positive turn around of flow. Thereby, all the slurry contained in the fluid runs away together with the turn around flow to eliminate the accumulation of the slurry in the neighbourhood of the seal, and the wear of the seal ring is suppressed to maintain an excellent sealing function of the mechanical seal for a long period of time.

While the device of the present invention has been briefly described, new features of the present invention will become completely apparent from reading of the ensuing detailed description in the light of the embodiment shown in the accompanying drawings. It is to be noted that the drawings are merely of one embodiment for explanation of the present invention but not intended to limit the technical scope of the present invention.

BRIEF DESCRIPTION OF THE DRAWINGS

FIG. 1 is a half sectional view showing the mounting state of a mechanical seal according to an embodiment of the present invention;

FIG. 2 is an enlarged sectional view of essential parts shown in FIG. 1; and

DESCRIPTION OF THE EMBODIMENT

Figure 3:
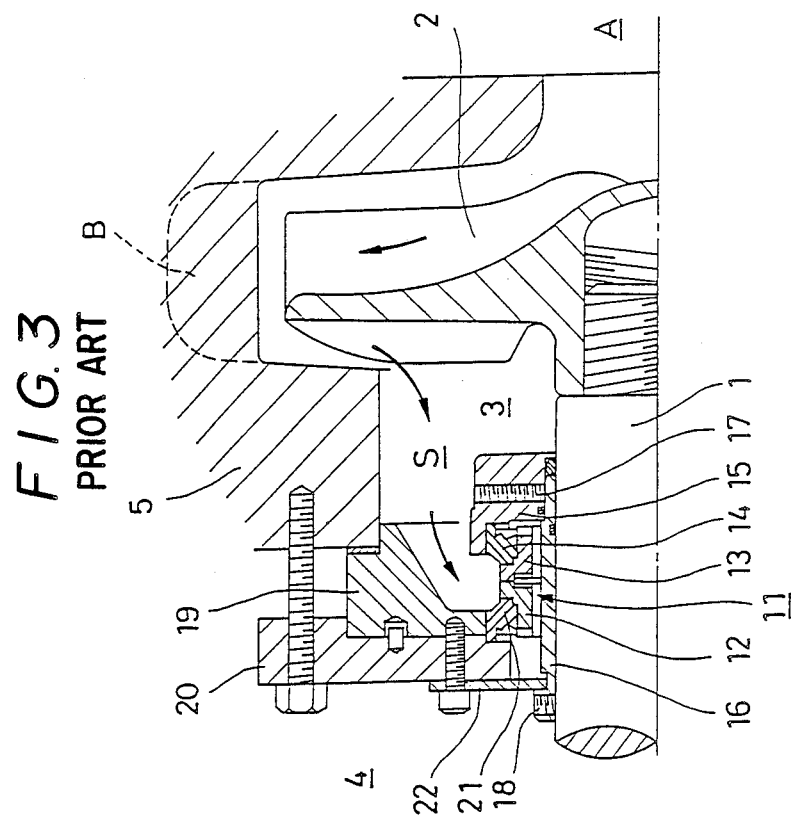
FIG. 3 is a half sectional view showing the mounting state of a conventional mechanical seal.

First, one example of a mechanical seal of the present invention shown in FIGS. 1 and Z will be compared with the prior art shown in FIG. 3. Secure to a seal cover 15 of a mechanical seal according to the present invention is an annular impeller 23 provided with a number of fins 24 at the outer periphery thereof and secured by means of bolts 25. Upon rotation of the impeller 23, this impeller 23 causes a flow of slurry liquid from the left side as viewed in the drawing where a seal ring 13 is positioned toward the right side. The slurry liquid flowing into the dead end portion turns around in an extremely smooth manner as indicated by the arrow to carry away the slurry taken by itself together with the turned around of flow.

While the preferred embodiment of the present invention has been described, it will be obvious that other numerous modifications of the present invention may be made without departing from the principle thereof. Accordingly, it is desired that all the modifications by which the effect of the present invention may be substantially obtained through the use of constituents substantially identical with or corresponding to those of the present invention are included therein.

What is claimed is:

1. A mechanical seal apparatus comprising a housing, a shaft rotatably mounted in said housing, an impeller fixed to said shaft and operable to pump a fluid containing a slurry, said housing having an impeller chamber in which said impeller rotates, said housing having an axial-extending section having one axial end which extends axially from said impeller chamber, seal-support means mounted on the other axial end of said axial-extending section, said axial-extending section having an inner diameter greater than the diameter of said shaft to thereby define an axial-annular passage between said shaft and said axial-extending section of said housing, said seal-support means extending radially inwardly of said axial-extending section of said housing to thereby define one axial end of said axial-annular passage, non-rotating seal means which includes a non-rotating seal ring mounted on said seal-support means and disposed in said axial-annular passage, rotating seal means which includes a rotating seal ring mounted on said shaft and disposed in said axial-annular passage between said non-rotating seal means and said impeller, said non-rotating and said rotating seal rings having opposed sealing faces generally perpendicular to the axis of said shaft, said rotating seal means comprising annular seal-mounting means secured to said shaft and mounting said rotating seal ring, said seal-mounting means having an outer first diameter less than the inner diameter of said axial-annular passage, said rotating and non-rotating seal rings having a substantially equal second diameter which is less than said first diameter such that an annular space is located radially outwardly of said rotating and non-rotating seal rings and extending axially between said seal-mounting means and said seal-support means, and fin means extending from the outer periphery of said seal-mounting means for causing an axial flow of said fluid, said fin means having an outer diameter less than the outer diameter of said axial-annular passage to thereby define an outer annular axial flow passage between the outer diameter of said fin means and the outer diameter of said axial-annular passage such that said fluid flows axially from said impeller chamber through said outer annular axial flow passage to said annular space along a first flow path portion, said fin means being operable to cause said fluid to flow axially in an opposite direction from said annular space to said impeller chamber along a second flow path portion which is disposed radially inwardly of said first flow path portion, said first and second flow path portions being portions of a circulating flow path which circulates said fluid between said annular space and said impeller chamber such that slurry in the fluid being pumped is precluded from being accumulated in said annular space.

2. A mechanical seal apparatus according to claim 1, wherein said rotating and non-rotating seal rings each has an outer cylindrical surface defining the inner radial boundary of said annular space, said seal-mounting means comprising a seal cover element having an outer cylindrical mounting surface defining the outer boundary of said seal-mounting means, said cylindrical-mounting surface having a diameter greater than the diameter of said outer cylindrical surface of said rotating and non-rotating seal rings, said fin means being mounted on said cylindrical mounting surface.

3. A mechanical seal apparatus according to claim 2, wherein said seal cover element has an end face perpendicular to the axis of said shaft, said fin means comprising a first part disposed on said cylindrical mounting surface and another part mounted on said end face, said seal-mounting means further comprising fastening means fastening said second part to said end face.

* * * * *